United States Patent [19]

Owen et al.

[11] Patent Number: 5,014,642
[45] Date of Patent: May 14, 1991

[54] ADJUSTMENT MECHANISM FOR A TRANSMISSION POSITION INDICATOR

[75] Inventors: Marvin L. Owen, Grand Blanc; Frederick D. Jacobs, Holland, both of Mich.

[73] Assignee: Delco Electronics Corporation, Kokomo, Ind.

[21] Appl. No.: 379,467

[22] Filed: Jul. 13, 1989

[51] Int. Cl.⁵ ............................................ G01D 13/00
[52] U.S. Cl. ......................... 116/28.1; 116/DIG. 20; 116/281; 81/176.15; 81/488
[58] Field of Search .............. 116/28.1, DIG. 20, 281, 116/282; 81/176.1, 176.15, 488

[56]  References Cited

U.S. PATENT DOCUMENTS

| | | | |
|---|---|---|---|
| 1,636,370 | 7/1927 | Johnson | 81/176.15 |
| 2,925,061 | 2/1960 | Thornburgh et al. | 116/28.1 |
| 3,800,737 | 4/1974 | Lambiris | 116/28.1 |
| 3,830,192 | 8/1974 | Ronewicz et al. | 116/28.1 |
| 3,897,747 | 8/1975 | Biazzo | 116/36 |
| 3,898,723 | 8/1975 | Kirby et al. | 29/200 H |
| 3,990,387 | 11/1976 | Martin | 116/28.1 |
| 4,788,881 | 12/1988 | Owen et al. | 74/500.5 |
| 4,838,197 | 6/1989 | Watson | 116/28.1 |

Primary Examiner—William A. Cuchlinski, Jr.
Assistant Examiner—W. Morris Worth
Attorney, Agent, or Firm—Donald F. Scherer

[57]  ABSTRACT

A transmission operator lever mechanism is used to establish the desired operating condition in a transmission. An indicator mechanism with a pointer and indicia is provided to show the selected operating condition. The operator lever is connected with the indicator pointer through an adjustable mechanism comprising a clip and a cable. A tool engaging structure is formed on a portion of the lever mechanism. A tool is engageable in the clip and in the tool engaging structure to permit manipulation of the clip relative to the lever whereby the desired operating condition and the selected condition represented by the indicia and pointer will be in agreement.

3 Claims, 1 Drawing Sheet

ADJUSTMENT MECHANISM FOR A TRANSMISSION POSITION INDICATOR

BACKGROUND OF THE INVENTION

This invention relates to mechanisms for aligning a transmission indicator pointer and indicia in coordination with a manual control mechanism, and more particularly, to mechanisms which permit adjustment between the pointer and indicia after assembly of the indicating mechanism and the manual control in a vehicle.

An automatic transmission and control has an indicator mechanism including an indicia plate and a pointer. The pointer is connected with a manual control lever for coordinated movement. The indicia and pointer cooperate to inform the vehicle operator of the operating condition that has been selected.

During assembly of the transmission control and indicator mechanism, it is necessary to provide for alignment of the pointer and the indicia. This is generally accomplished by selecting an operating condition in the transmission, for example, "N" or neutral condition. The pointer is then aligned with the indicia for neutral. This is commonly termed "zeroing" the indicator.

One common method of zeroing is to provide a clip attached to a cable which, in turn, is connected with the pointer. The assembler pulls the clip and cable until the proper alignment between the pointer and indicia is attained. The clip is then secured to a component of the manual control mechanism for the transmission, such as a shift tube or shift bowl.

If the alignment is not correct, it is necessary to have the clip removed for realignment. This can occur more than once during the assembly. Proposed solutions to this arrangement are described in U.S. Pat. No. 2,925,061 Thornburgh et al., issued Feb. 16, 1960, and U.S. Pat. No. 4,788,881 Owen et al. issued Dec. 6, 1988, both of which are assigned to the assignee of the present invention. Thornburgh et al. describes a system wherein the mechanic or assembler applies tension to the cable, while securing a fastener in place on the shift tube to stabilize a clip and the cable. This requires the assembler to be working in the limited space under the instrument panel, with both hands and a tool. This can be difficult and time consuming.

Owen et al. has a clip which is secured to the shift bowl and has an adjustable portion connected with the indicator cable. A threaded member engages the adjustable portion. The threaded member is rotated to move the adjustable portion linearly relative to the clip thereby adjusting the indicator portion. This arrangement uses a number of parts that must be assembled prior to use with the transmission.

SUMMARY OF THE INVENTION

The present invention has a clip, which is connected with a transmission indicator by a cable and is movably secured to a component in the transmission control mechanism, such as a shift bowl or shift tube. The clip is retained on the transmission control mechanism by tangs or friction surfaces on the clip. An aperture is formed in the clip and a plurality of spaced grooves are formed on the transmission control mechanism.

To change the alignment of the transmission indicator relative to the transmission control mechanism, a tool is inserted in the aperture and in a selected groove. The tool is then rotated about the portion thereof which is disposed in the groove. This movement forces the clip to move along the transmission control mechanism to effect movement of the cable and therefore a portion of the transmission indicator.

It is therefore an object of this invention to provide an improved adjustable clip, transmission control mechanism and transmission indicator mechanism, wherein the clip and control mechanism have tool engaging portions which permit the clip to be manipulated by a tool whereby the indicator mechanism is adjusted relative to the control mechanism.

It is another object of this invention to provide an improved transmission position indicator and adjustment mechanism having an indicia pointer cable and clip, wherein the clip is retained on a portion of a transmission control, and further wherein the clip and transmission control portion have tool engaging portions in which a tool member is engaged and manipulated to move the clip on the portion and thereby adjust the pointer relative to the transmission control for proper alignment with indicia on the indicator. It is a further object of this invention to provide an improved transmission position indicator and adjustment mechanism as described in the preceding object, wherein the tool engaging portion in the clip is an aperture substantially aligned with the retention mechanism of the clip and portion, such that the force imposed thereon by the tool will not result in tilting of the clip relative to the portion.

These and other objects and advantages of the present invention will be more apparent from the following specification and drawings.

DESCRIPTION OF THE EXEMPLARY EMBODIMENT

Figure 1:
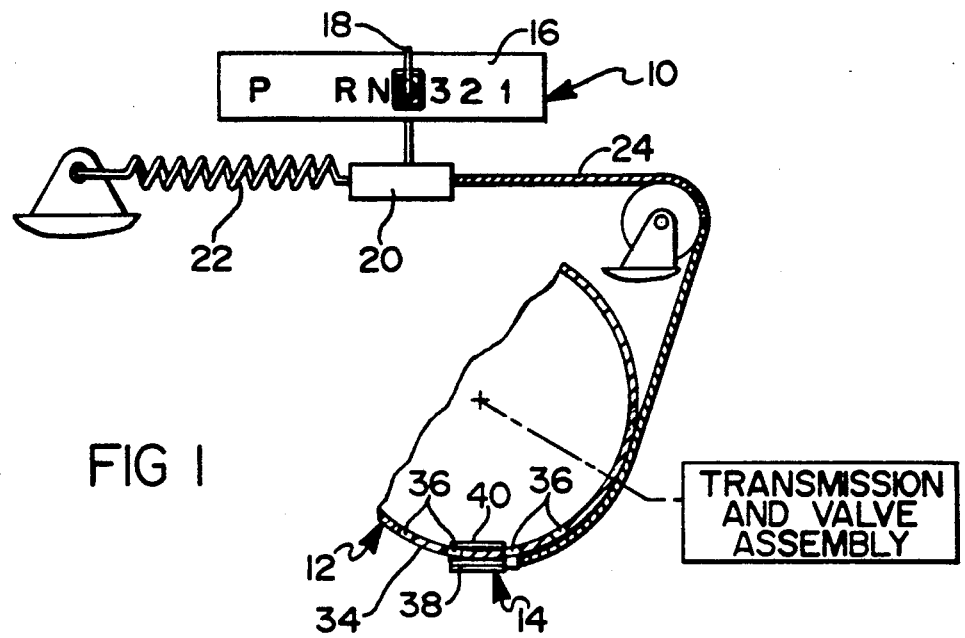
FIG. 1 is a diagrammatic representation of a transmission control and indicator incorporating the present invention.
Figure 2:
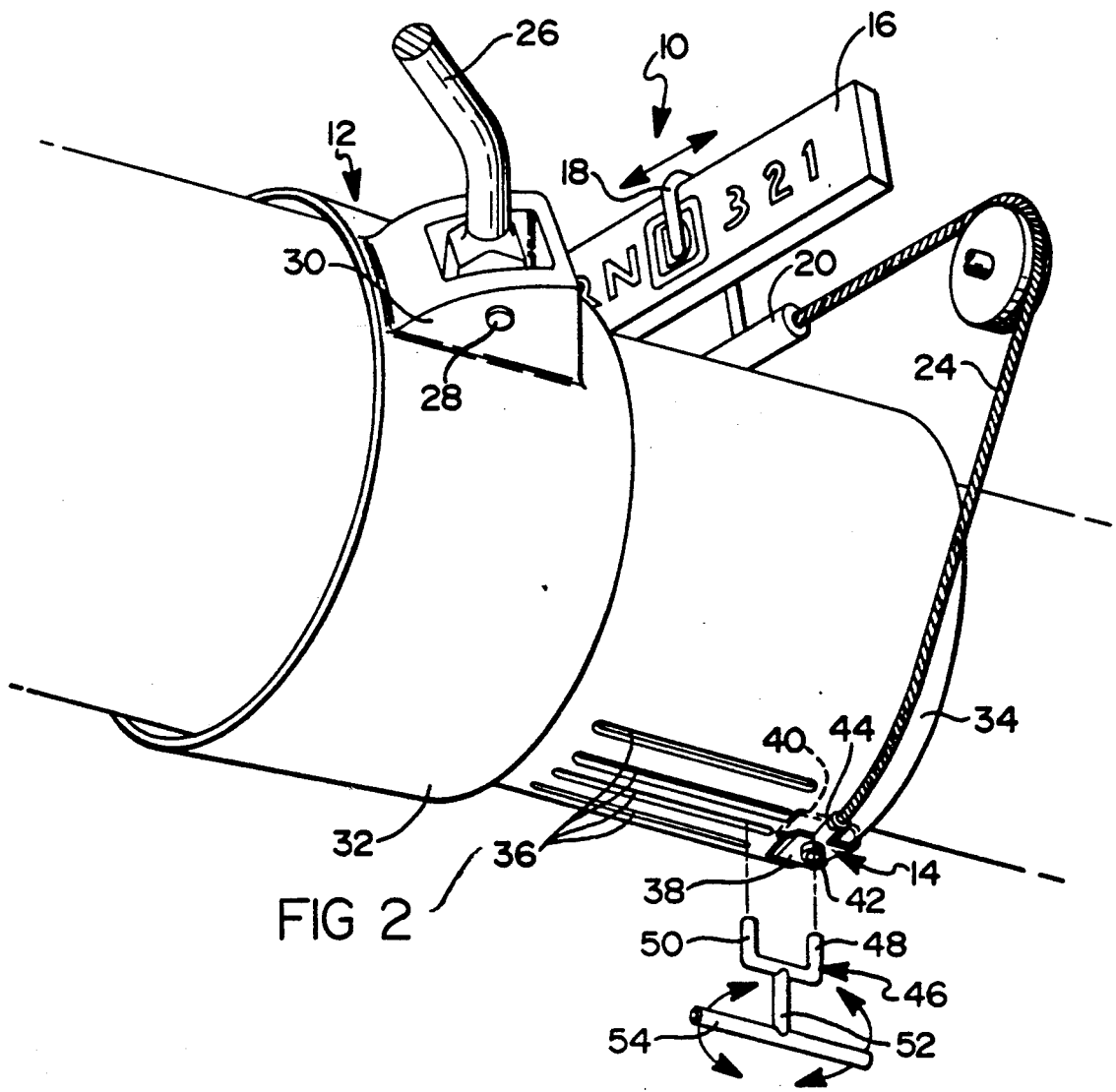
FIG. 2 is a perspective view of a transmission control and indicator incorporating the present invention, and also showing a tool which can be used for adjusting the indicator assembly.

Referring to the drawings, there is seen in FIGS. 1 and 2, a transmission indicator mechanism 10, a manually controlled shift mechanism 12, and an indicator adjustment clip 14. The indicator mechanism 10 includes an indicia plate 16 on which is formed a plurality of indicia signifying various transmission operating conditions. These operating conditions include Park "P", Reverse "R", Neutral "N", and a plurality of drive conditions "D", "3", "2" and "1". This is an indicia plate used with a four speed transmission, wherein the drive D condition includes two underdrives, a direct drive and an overdrive. Obviously, if a three speed transmission is utilized, the drive condition 3 would be eliminated on the indicia plate.

The indicator mechanism 10 also includes a pointer 18 which is secured to a slide member 20. The slide member 20 is urged leftward by a spring 22 and has attached thereto, a cable 24 which is secured with the clip 14.

The shift mechanism 12 has a manual lever 26 which is pivotally mounted on a pin 28 within a housing 30 formed on a shift bowl or shift tube 32. The shift tube 32 has a lower skirt portion 34, in which is formed a plurality of grooves 36. In the alternative, the grooves 36 can be formed between adjacent upstanding ribs. The clip 14 is movably secured on the skirt 34 in close proximity with one or more of the grooves 36.

The clip 14 has a pair of plate portions 38 and 40 disposed on opposite sides of the skirt 34. These plate portions 38 and 40 have frictional surfaces or formed surfaces which engage the peripheral surfaces of the skirt 34 to maintain the position of the clip 14. The plate 38 has an aperture 42 which is substantially centrally located in the plate 38 and aligned with an attachment tab 44 which connects the cable 24 to the clip 14.

During assembly of the transmission indicator mechanism in a vehicle, the manual shift mechanism 12 is positioned at an operating condition, for example, drive 1. The assembler will then pull the clip 14 and cable 24 against the spring 22 until the pointer 18 is aligned with the indicia 1 on the plate 16. The clip 14 is then frictionally engaged on the skirt 34. If the pointer 18 does not remain in alignment because of some slight misadjustment by the assembler, a tool 46 is inserted into the aperture 42 and one of the grooves 36. The tool 46 is then rotated forcing the clip 14 to move along the periphery of the shift bowl 32 until the proper alignment between the pointer 18 and the selected indicia is achieved.

The tool 46 has a pair of upstanding legs 48 and 50, a central stem 52 and a handle 54. The leg 50 is inserted in one of the grooves 36, and the leg 48 will be inserted simultaneously in the aperture 42. The mechanic or assembler can then rotate the handle 54, which in turn, will cause the entire tool 46 to rotate about the leg 50 disposed in the groove 36. The tool permits the mechanic or assembler to have significant leverage or mechanical advantage, such that the clip 14 can be manipulated with a minimum of manual input force. The tool 46 is not limited to the exact structure shown, and the handle may be positioned directly over the leg 50 or at any point intermediate the legs 48 and 50. A number of different configurations for the tool will be obvious to those familiar with these devices.

It should be appreciated that the clip 14 may include a slot instead of aperture 42 and that a straight edge tool, such as a screwdriver, can be used to simultaneously engage one of the grooves 36 and the slot. At this point, the screwdriver can be rotated to cause movement of the clip 14 along the skirt 34 relative to the grooves 36. One important aspect of this invention is that the grooves are disposed on a component in the shift control mechanism, such as the shift bowl. Thus, the shift control member will remain stationary during adjustment.

The indicator mechanism can be constructed in accordance with many of the well known indicator assemblies, such as those shown in U.S. Pat. No. 4,788,881, issued to Owen et al. Dec. 6, 1988, and U.S. Pat. No. 4,782,782 issued to Nill Nov. 8, 1988, and assigned to the assignee of the present invention.

The manual shift control mechanism 12 is connected in a well known manner via linkages or a cable to the transmission and valve assembly of a conventional automatic transmission. As is well known, such valve assemblies have a manual valve which is positioned to direct fluid from a control pump to a plurality of passages which are connected to valve members and/or to friction devices, such as clutches and brakes. The manual valve member has operatively connected therewith an external lever arm which is visible from under the vehicle. The mechanic or assembler can view the lever to ensure which position of the manual valve has been selected. This visual check can be used by the assembler, if desired, to ensure the operating condition that has been selected prior to manipulation of the clip 14.

The embodiments of the invention in which an exclusive property or privilege is claimed are defined as follows:

1. A transmission position indicator and adjustment mechanism comprising: indicia and pointer means for indicating a selected transmission position including indicia for a plurality of transmission positions and a pointer; flexible means operatively connected with said indicia and pointer means; operator control means for selecting a desired transmission position including adjustment means formed thereon; clip means adjustably connected to said operator control means and secured to said flexible means for interconnecting said operator control means with said indicia and pointer means; and tool means engageable with said adjustment means and said clip means for manipulating said clip means to move relative to said operator control means whereby said pointer is aligned with indicia corresponding to the desired transmission position selected by said operator control means.

2. A transmission position indicator and adjustment mechanism comprising: indicia and pointer means for indicating a selected transmission position including indicia for a plurality of transmission positions and a pointer; flexible means operatively connected with said indicia and pointer means; operator control means for selecting a desired transmission position including a cylindrical shroud member, and a plurality of spaced grooves formed in said shroud member; and clip means adjustably connected to said shroud member adjacent said grooves and secured to said flexible means for interconnecting said operator control means with said indicia and pointer means, said clip means having a centrally disposed tool engaging aperture means for cooperating with a tool and said grooves for permitting adjustment of said clip along the periphery of said cylindrical shroud.

3. A transmission position indicator and adjustment mechanism comprising: indicia and pointer means for indicating a selected transmission position including indicia for a plurality of transmission positions and a pointer; flexible means operatively connected with said indicia and pointer means; operator control mans for selecting a desired transmission position having adjustment means including a plurality of grooves formed thereon; clip means frictionally connected to said operator control means adjacent said grooves and secured to said flexible means for interconnecting said operator control means with said indicia and pointer means including a centrally disposed aperture; and tool means engageable in said grooves and aperture for manipulating said clip means to move relative to said operator control means whereby said pointer is aligned with indicia corresponding to the desired transmission position selected by said operator control means.

* * * * *